United States Patent
Ravishankar et al.

(10) Patent No.: US 10,152,310 B2
(45) Date of Patent: Dec. 11, 2018

(54) FUSING A SEQUENCE OF OPERATIONS THROUGH SUBDIVIDING

(71) Applicant: Nvidia Corporation, Santa Clara, CA (US)

(72) Inventors: Mahesh Ravishankar, Redmond, WA (US); Paulius Micikevicius, Santa Clara, CA (US); Vinod Grover, Redmond, WA (US)

(73) Assignee: Nvidia Corporation, Santa Clara, CA (US)

( * ) Notice: Subject to any disclaimer, the term of this patent is extended or adjusted under 35 U.S.C. 154(b) by 86 days.

(21) Appl. No.: 14/723,141

(22) Filed: May 27, 2015

(65) Prior Publication Data
US 2016/0350088 A1   Dec. 1, 2016

(51) Int. Cl.
*G06F 9/45*       (2006.01)
*G06F 8/41*       (2018.01)

(52) U.S. Cl.
CPC .............. *G06F 8/4434* (2013.01); *G06F 8/45* (2013.01); *G06F 8/41* (2013.01)

(58) Field of Classification Search
CPC .......... G06F 8/443; G06F 8/45; G06F 8/4441; G06F 8/452
See application file for complete search history.

(56) References Cited

U.S. PATENT DOCUMENTS

| | | | |
|---|---|---|---|
| 6,286,135 B1 * | 9/2001 | Santhanam | G06F 8/443 717/146 |
| 9,798,527 B1 * | 10/2017 | Bendersky | G06F 8/41 |
| 2007/0294682 A1 * | 12/2007 | Demetriou | G06F 8/45 717/153 |
| 2009/0150654 A1 * | 6/2009 | Oberman | G06F 9/30014 712/221 |
| 2011/0047534 A1 * | 2/2011 | Ye | G06F 8/443 717/160 |
| 2013/0117736 A1 * | 5/2013 | De Smet | G06F 8/30 717/153 |

(Continued)

OTHER PUBLICATIONS

"Bob Blainey, Christopher Barton, Jose Nelson Amaral";"Removing Impediments to Loop Fusion Through Code Transformations";"2005";"Spring Berlin Heidelberg";"vol. 2481";"pp. 309-328".*

(Continued)

*Primary Examiner* — Wei Y Zhen
*Assistant Examiner* — Brahim Bourzik
(74) *Attorney, Agent, or Firm* — Eric Metzger; Parker Justiss, P.C.

(57) ABSTRACT

A compiler and a method of compiling code that reduces memory bandwidth when processing code on a computer are provided herein. In one embodiment, the method includes: (1) automatically identifying a sequence of operations for fusing, wherein the sequence of operations correspond to instructions from a source code, (2) determining subdivisions of a final output of the sequence of operations, (3) determining input data and intermediate operations needed to obtain a final subdivision output for each of the subdivisions and (4) automatically generating code to fuse the sequence of operations employing the subdivisions, wherein the automatically identifying and the automatically generating are performed by a processor.

14 Claims, 4 Drawing Sheets

(56) References Cited

U.S. PATENT DOCUMENTS

| | | | |
|---|---|---|---|
| 2013/0124561 A1* | 5/2013 | Pradhan | G06F 17/30424 |
| | | | 707/769 |
| 2017/0308376 A1* | 10/2017 | Barsness | G06F 8/41 |
| 2018/0095752 A1* | 4/2018 | Kudaravalli | G06F 12/0875 |

OTHER PUBLICATIONS

Ravishankar, M., et al., "FORMA: A DSL for Image Processing Applications to Target GPUs and Multi-Core CPUs," Feb. 7, 2015, ACM, San Francisco, 12 pages.

* cited by examiner

FUSING A SEQUENCE OF OPERATIONS THROUGH SUBDIVIDING

TECHNICAL FIELD

This application is directed, in general, to reducing memory bandwidth requirements for processors and, more specifically, to reducing memory bandwidth requirements for processing a sequence of operations.

BACKGROUND

In data processing operations, a computer performs various tasks or operations on data to obtain a final output. Convolution operations or convolutions are an example of a sequence of operations performed on input data to produce desired outputs. For example, in the computing domains of image processing and machine learning, a sequence of convolution kernels are often used. Operation of the convolution kernels, however, can require many memory accesses. As such, memory bandwidth required for these convolution kernels is usually an obstruction or bottleneck for performance.

SUMMARY

In one aspect, the disclosure provides a method for compiling code to reduce memory bandwidth when processing code on a computer. In one embodiment, the method includes: (1) automatically identifying a sequence of operations for fusing, wherein the sequence of operations correspond to instructions from a source code, (2) determining subdivisions of a final output of the sequence of operations, (3) determining input data and intermediate operations needed to obtain a final subdivision output for each of the subdivisions and (4) automatically generating code to fuse the sequence of operations employing the subdivisions, wherein the automatically identifying and the automatically generating are performed by a processor.

In another aspect, the disclosure provides a computer program product including a series of operating instructions stored on a non-transitory computer readable medium that directs a processor to perform a method to generate executable code for operation on computer system. In one embodiment, the method, includes: (1) automatically identifying a sequence of operations for fusing, wherein the sequence of operations correspond to instructions from a source code, (2) determining subdivisions of a final output of the sequence of operations, (3) determining input data and intermediate operations needed to obtain a final subdivision output for each of the subdivisions and (4) automatically generating executable code for operation on a particular computer architecture, wherein the executable code fuses the sequence of operations employing the subdivisions.

In yet another aspect, the disclosure provides a compiler. In one embodiment, the compiler includes: (1) a processor, (2) a source code examiner configured to analyze source code and automatically identify for fusing a sequence of operations corresponding to the source code and (3) an output code generator configured to automatically generate output code that fuses the sequence of operations employing subdivisions of a final output of the sequence of operations.

BRIEF DESCRIPTION

Reference is now made to the following descriptions taken in conjunction with the accompanying drawings, in which.

DETAILED DESCRIPTION

One way that programmers try to address memory bandwidth bottlenecks is by controlling how intermediate data from a sequence of convolution kernels is handled. Identifying memory bandwidth bottlenecks in a program, however, can be difficult even for experienced programmers. Once identified, determining how to reduce or remedy the problem is an additional matter. This is especially true when considering that various programs can be run on different computer architectures, such as those that include a graphics processing unit (GPU).

It is realized herein the advantage of automatically identifying memory bandwidth bottlenecks, which includes potential memory bandwidth bottlenecks, in a program. Additionally, it is further realized herein the advantage of automatically determining how to resolve the memory bandwidth bottleneck in the program. As such, memory bandwidth bottlenecks can be addressed independent of the skill of a programmer.

Accordingly, the disclosure provides a memory bandwidth reduction scheme that automatically identifies a sequence of operations for fusing, such as convolution kernels, and generates code to control processing of the data needed to obtain the final output from the sequence. Processing of the data includes retrieving and storing the original data, storing the intermediate data generated by the sequence, and storing the final output data. Fusing operations or fusion thereof as used herein is combining multiple operations such that intermediate data are not stored in an external memory. In one embodiment, fusing operations includes combining or blending multiple operations into one processing thread. The operations can include functions or computations that are performed by a processor. In one embodiment, the sequence of operations can be a sequence of convolution kernels. As discloses herein, via fusing a sequence of convolution kernels can be advantageously merged into a single kernel.

In one embodiment, a compiler is disclosed that automatically performs the fusing and generating of the code. In some embodiments, the fusing and code generation is based on a compiler's high level knowledge of the sequence of operations. Based on this knowledge, the compiler is able to determine the input data and intermediate operations needed to obtain the final output and code needed to control the data during the sequence of operations. In some embodiments the compiler employs knowledge of specifications, such as the sequence of operations, when determining what to fuse and thereafter knowledge of a computer architecture when generating the actual code. As such, once the compiler has made the fusing decision, the compiler is then configured to generate code that is specialized for the specific computer architecture.

In one embodiment, a compiler is disclosed that employs subdividing to fuse the sequence of operations and reduce memory bandwidth for processing the sequence. Subdividing is a process of dividing a final output of a series of computations or operations into subdivisions that are individually processed. For example, in image processing tiling is used to subdivide an image into subdivisions or tiles for rendering. Tiling and tiles will be used herein when discussing the particular image processing domain. Advantageously, the disclosure provides a compiler that can automatically determine when to employ subdividing, such as tiling, for a sequence of operations and how to store the intermediate results from the sequence in a local memory to reduce memory bandwidth.

A local memory as used herein is physically located close to the processing or processing device and can be quickly accessed for processing; at least compared to an external memory. Typically, compared to the storage capacity of an external memory, the storage capacity of a local memory is small. Accordingly, as used herein an external memory, compared to a local memory, is farther from the processor, has a longer access time and has a larger storage capacity. In one embodiment, a local memory is a memory that is proximate to a processor and can be accessed without using a data bus external to the processor. In contrast, in one embodiment an external memory is accessed via a data bus between the processor and the external memory. Examples of a local memory are a shared memory buffer in a GPU and a cache with a CPU. Examples of an external memory as used herein are a global memory in a GPU and a main memory with a CPU. A global memory and a main memory, for example, when compared to a shared memory and cache, respectively, are located farther from the processor, have a longer access time, and have a larger storage capacity.

Memory bandwidth as used herein is the data bandwidth needed between a processor and a memory for reading data from and writing data to a memory. For example, the bandwidth needed on the data bus to global memory in a GPU or main memory in a CPU. A memory bandwidth bottleneck occurs when processing of data is delayed due to waiting on data to be read or written into the memory.

Figure 1:
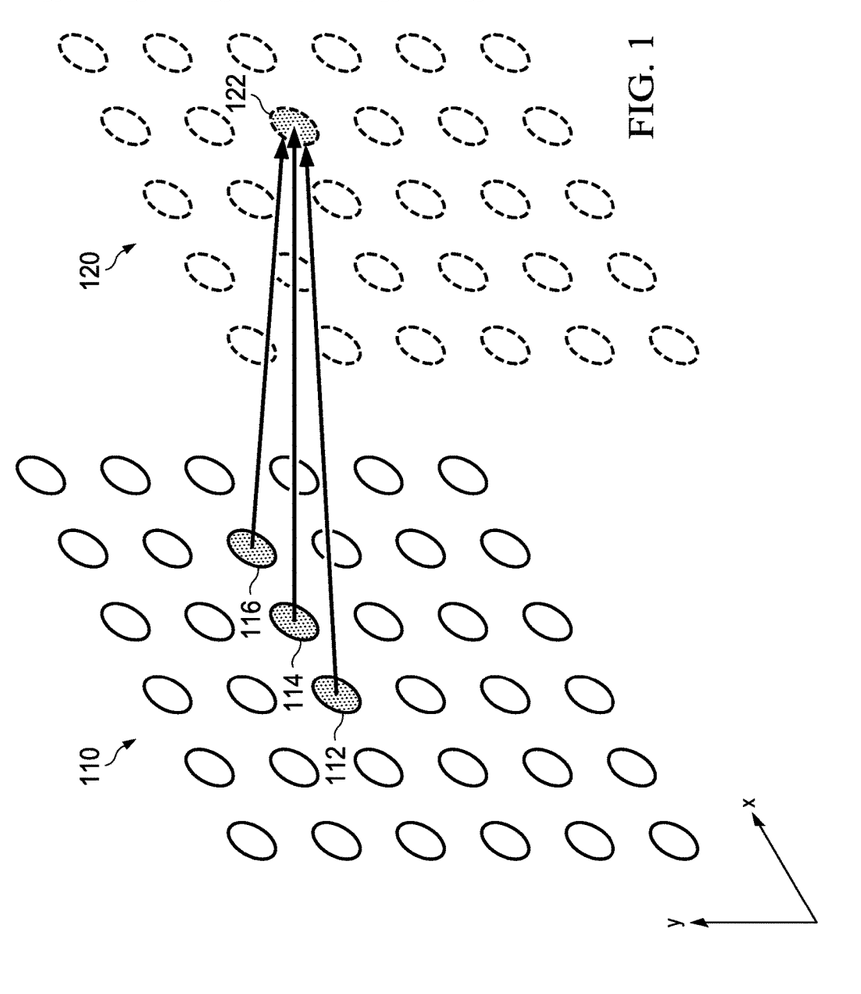
FIG. 1 illustrates image pixels that demonstrate a GPU execution schematic for a function "blurx" used in the image processing domain.
Figure 2:
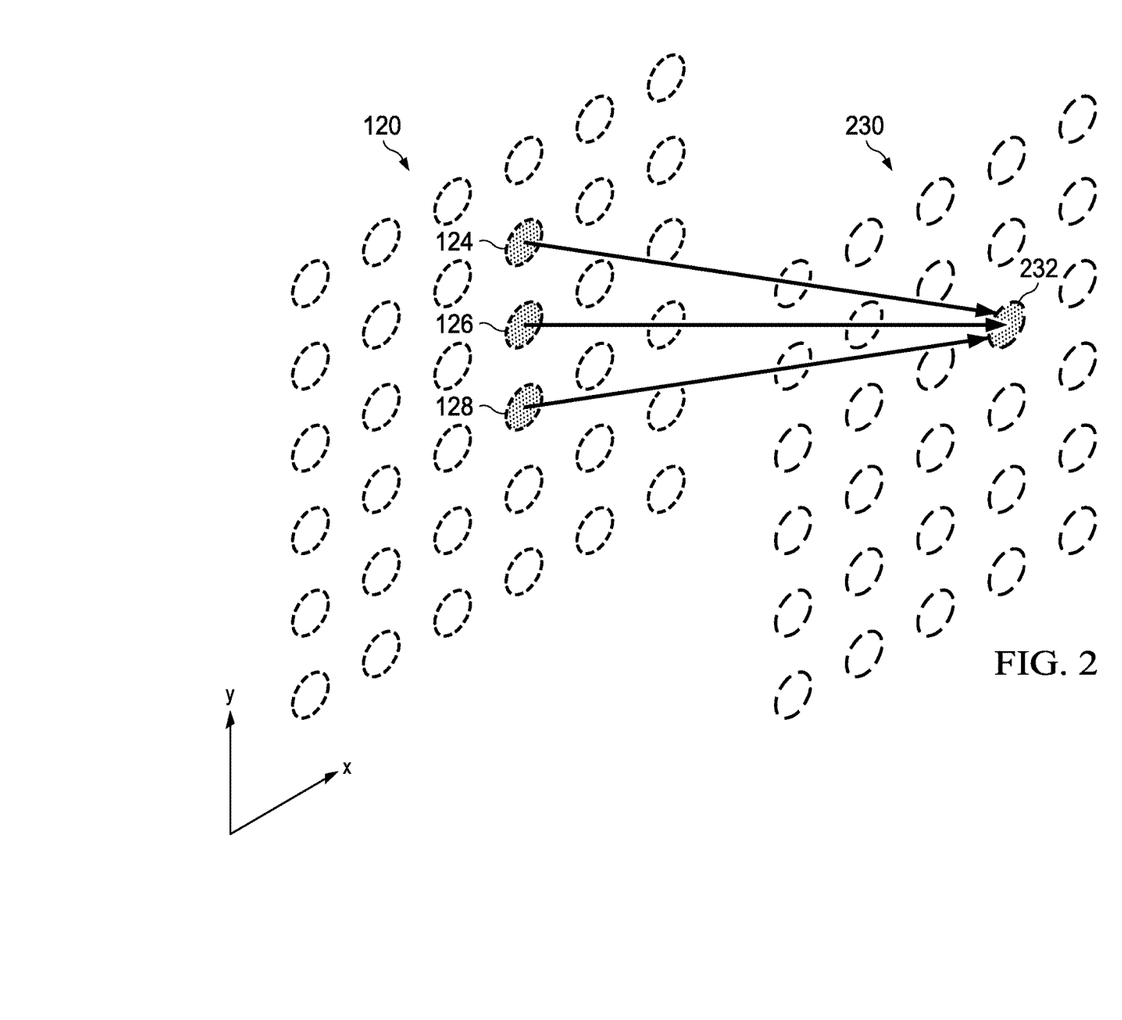
FIG. 2 illustrates image pixels that demonstrate a GPU execution schematic for a function "blury" used in the image processing domain.

The following discussion with respect to FIG. 1 and FIG. 2 will provide an illustration of a memory bandwidth bottleneck in the image processing domain. FIG. 1 illustrates image pixels that demonstrate a GPU execution schematic for a function "blurx." FIG. 2 illustrates image pixels that demonstrate a GPU execution schematic for a function "blury." FIG. 3 and the corresponding discussion will provide an example of resolving memory bandwidth issues in the same image processing domain of FIG. 1 and FIG. 2 according to the principles of the disclosure. The below listing, Listing 1, provides a specification of an image processing pipeline in a domain specific language (DSL), Forma. Listing 1 provides the operations needed to perform the image processing procedure Blur.

Forma is a DSL from Nvidia Corporation of Santa Clara, Calif. A Forma compiler can generate code to target parallel processors, such as Compute Unified Device Architecture (CUDA) code to target GPU's from NVIDIA Corporation.

Additionally, Forma can generate code to target central processing units (CPU), such as C code with OpenMP pragmas to target multi-core CPUs. More information about Forma can be found in the article entitled "Forma: A DSL for Image Processing Applications to Target GPUs and Multi-core CPUs," by Mahesh Ravishankar, et al., which is incorporated herein by reference in its entirety. While the specific DSL Forma is used herein as an example in the image processing domain, one skilled in the art will understand that the principles disclosed herein apply to other DSLs or programming and code generation tools that provide constructs for easy specification of common operations in other languages and computing domains. In one embodiment, the memory bandwidth reduction schemes disclosed herein can be employed by compilers such that the producer-consumer relationship between different processing stages, such as pipeline stages, can be captured and optimizations performed.

| Listing 1: Blur in Forma for Processing an Image |
|---|
| 1  stencil blurx ( vector #2 float X) { |
| 2  return (@ [ −1 ,0] + X + X@ [1 ,0])/3.0; |
| 3  } |
| 4  stencil blury ( vector #2 float Y) { |
| 5  return (Y@ [0 , −1] + Y + Y@ [0 ,1])/3.0; |
| 6  } |
| 7  parameter M,N; |
| 8  vector #2 float input [M,N]; |
| 9  temp = blurx ( input ); |
| 10 output = blury ( temp ); |
| 11 return output ; |

The above Listing 1 shows the specification of a simple image processing pipeline in Forma to perform the image processing procedure Blur. A "stencil" computation is specified as a function prefixed with the keyword stencil that is to be applied over an image that is passed as an argument to the stencil function. The image is stored in global memory of the GPU. For example, the function "blurx" specifies a stencil that operates on a 2D image or vector. Applying the blurx function to an image input at Line 9 of Listing 1, performs the stencil computation on the input to generate the "image temp." The data type used for storing the image, as well as its size is computed automatically by the Forma compiler based on the specification of the stencil. For example, the image temp is deduced to be a 2D image of floats with its size being the same as the size of the input. The body of a stencil function specifies the computation that gives the value at a point (i, j) of the result image. Use of the @ operator allows access to neighboring points of the image passed as the argument to the function. For example, X@[−1,0] refers to the value at a point (i−1, j) of X while computing the value at point (i, j) of the result. References to the argument without use of the @ operator are analogous to the expression X@[0,0].

A naive execution of the computations shown in Listing on the GPU would typically be two separate kernels; one to perform the computation corresponding to blurx (FIG. 1), and the other to perform the computation corresponding to blury (FIG. 2). Within each of these kernels, a thread on the GPU would be responsible to compute the value of a single point 122 of the temporary image or image temp 120 as shown in FIG. 1. For the first kernel, represented by FIG. 1, each thread would read three elements 112, 114, 116, of the image input 110 from global memory and perform one global memory write of the result value of point 122 in image temp 120.

Similar processing would happen for the second kernel represented by FIG. 2. Each thread would read three elements 124, 126, 128, of the temp image 120 from global memory and perform one global memory write of the result value of a point 232 in final output image 230. Therefore, computing the value at the single point 232 of the final output image 230, which is a final image in the image processing domain, would require six global memory loads and two global memory writes. This results in significant pressure on the bandwidth between the processor and global memory. Consider for example a larger stencil such as a simple 5×5 Gaussian Blur kernel that issues twenty five loads per thread and one global memory store.

The same is true for a naive execution on a CPU. The computation for each of the stencil functions is performed within loop nests that iterate over the output image and compute the value of each pixel. The value at points of the intermediate image temp that are along the same column (along the y-axis) are reused while computing the value at points along the same column of the output image. When image sizes are large, these values are evicted from cache before they can be reused resulting in a performance degradation.

Figure 3:
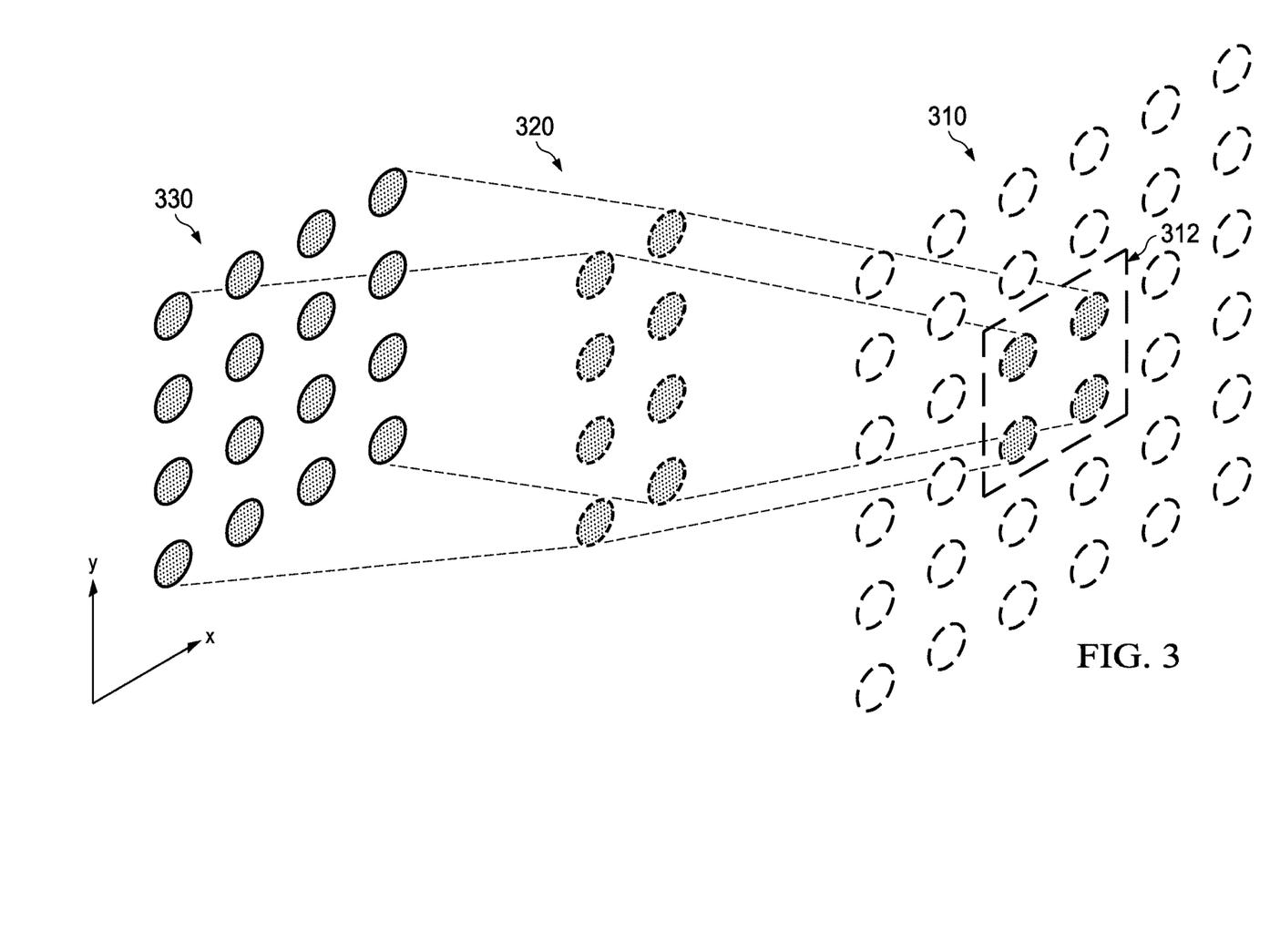
FIG. 3 illustrates an embodiment of a GPU execution schematic for generating an output image carried out according to the principles of the disclosure.

Turning now to FIG. 3, a diagram is provided that illustrates an example of reducing memory bandwidth as disclosed herein. Tiled execution of code generated by a DSL compiler for GPUs and an algorithm employed by the compiler to generate the code are disclosed below in the discussion of FIG. 3. The generated code is configured to process images and the desired final output is an output image generated for a display. To reduce the memory bandwidth requirement during the generation of the output image, a combination of tiling and fusion is used.

FIG. 3 provides an illustration of an embodiment of a GPU execution schematic for generating an output image 310 carried out according to the principles of the disclosure. In one embodiment, the output image 310 is the same as the final output image 230 of FIG. 2. In one embodiment, a compiler generates the code for execution on the GPU wherein the code is generated for tiled execution.

The output image 310 is a 6×6 array of pixels for display that is divided into subdivisions or tiles for computation. The final tile output for each of the tiles, final tile outputs, are joined to provide the output image 310. One final output tile, a 2×2 array of pixels, is identified as tile 312 and will be used to represent the combination of fusing and tiling as disclosed herein. One skilled in the art will understand that the size of the pixels arrays used herein are provided as an example and can vary according to different applications.

Because of the high level knowledge of an application or program, a compiler, such as a DSL compiler, is configured to look at the final tile output 312 and determine the input data and intermediate computations needed to generate the final tile output 312. In this example, the application is a stencil function, blury, that is used to generate the output image 310. On the GPU, each tile of the output image 310 is evaluated by a thread-block such that each thread computes the value at a single point. As such, tile 312 is computed by a single thread block.

A compiler has a high-level knowledge when it is configured to provide constructs allowing application developers to specify a computation in more abstract terms. DSL compilers are an example of such high-level programming languages. These type of compilers target a specific domain, such as image processing, and can obtain more information about computations due to the constructs that make sense for that targeted domain. More generic programming languages, such as C, cannot provide those constructs since they do not generalize as well.

Figure 4:
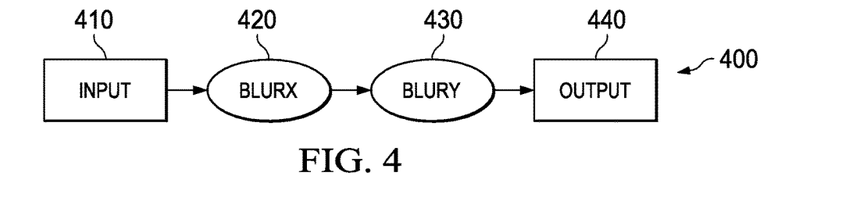
FIG. 4 illustrates a Directed Acyclic Graph (DAG) of an image processing pipeline "Blur;"

In some embodiments, a compiler can employ a Directed Acyclic Graph (DAG) to analyze computations and determine the needed inputs and intermediate operations, such as an intermediate function or computation. One skilled in the art will understand that a DAG is a directed graph with no directed cycles. A DAG 400 of the processing pipeline Blur is illustrated in FIG. 4. A compiler, such as a Forma compiler, can capture the producer-consumer relationship between the different stages of an image processing pipeline in the form of a DAG. FIG. 4 shows the different stages involved in computing the image output from the input image using the pipeline specified in Listing 1.

The DAG 400 includes an input 410, an intermediate operation 420, a final operation 430 and a final output 440. In the DAG 400, the intermediate operation 420 is a stencil function blurx and the final operation 430 is the function blury. One skilled in the art will understand that multiple intermediate operations can be employed in other embodiments. In the following discussion, the intermediate operation 420 and the final operation 430 will be referred to as blurx 420 and blury 430, respectively.

From the DAG 400 of the computation, a compiler determines that the argument to the function blury 430 is itself computed using the stencil function blurx 420. Accordingly, the compiler generates code to compute, in shared memory, the tile of the result of the stage blurx 420 needed to compute a tile of the result of stage blury 430. Since the stencil blury 430 accesses neighboring points at a distance 1 and −1 along the y-direction, the size of this intermediate tile, identified as tile 320 in FIG. 3, has to be increased by 1 along the positive and negative y-directions.

To compute the values of this intermediate tile 320, the function blurx 420 is applied to a region of the input image, input region 330 of FIG. 3, which corresponds to the input 410 of FIG. 4. An input image for processing is stored in an external memory, such as a global memory. Since the input image is already in the global memory, the compiler generates code to read the required region of this image, input region 330, into shared memory. The stencil blurx 420 accesses neighboring points at a distance 1 and −1 along the x-direction of the input image. Consequently, the size of the input region 330 needed is the size of the intermediate tile 320 increased by 1 along the positive and negative x-direction.

In one embodiment, the entire computation for generating the output tile 312 is performed within a single kernel that allows reading one element from global memory and storing one value to the global memory. Therefore the sequence of convolution kernels typically needed to generate the final output image, such as discussed with respect to FIG. 1 and FIG. 2, has been fused into a single kernel. Other tiles of the output image 310 are similarly generated to create the output image 310. One skilled in the art will understand that neighboring blocks of the kernel executions end up computing values along the extended regions of intermediate tiles in redundant fashion. The benefit of reducing global memory accesses in GPUs, however, outweighs the cost of performing redundant computations.

Algorithm 1 presented below illustrates an example of tiled execution of code generated by a Forma compiler for GPUs. Algorithm 1 specifically discloses computing a tile based on a DAG of the computation, a node in the DAG being analyzed and the tile size along each dimension used to compute the result of the DAG node being analyzed. As discussed above, Algorithm 1 can be performed within a single kernel.

---

Algorithm 1: ComputeTile(G,v,$\vec{T}$)

Input: G: DAG of the computation
    v: Node in the DAG being analysed
    $\vec{T}$: The tile size along each dimension used to compute the result of v
1  begin
2  | Consumed = $\phi$;
3  | foreach p∈v.Predecessor do
4  | | $\vec{E}$ = MaxPositive(v,p) − MaxNegetive(v,p);
5  | | $\vec{T}_p$ = $\vec{T}$ + $\vec{E}$;
6  | | if p.IsStencil then
7  | | | $p_{val}$ = ComputeTile($\vec{G}$,p,$\vec{T}_p$);
8  | | ⌊Consumed = Consumed ∪$p_{val}$;
9  | | else
10 | | | ComputeInMemoryIfUnavailable(G,p) ;
11 | | | $p_{val}$ = LoadTileToShared(p,$\vec{T}_p$) ;
12 | ⌊ ⌊Consumed = Consumed ∪$p_{val}$;
13 ⌊ R = ConsumeFromSharedMem(v,$\vec{T}$,Consumed);

---

Algorithm 2 describes the procedure to generate the tiled code on a GPU by a Forma compiler. Algorithm 2 is provided below.

---

Algorithm 2: ComputeInMemoryIfUnavailable(G,v)

Input: G: DAG of the computation
    v: Node in the DAG being evaluated
1  begin
2  | if ¬ v.IsComputed then
3  | | if v.IsStencil then
4  | | | $\vec{T}$ = DEFAULT_TILE_SIZE;
5  | | | R = ComputeTile(G,v,$\vec{T}$);
6  | | | I = ComputeTileIndex($\vec{T}$,v.Size);
7  | | ⌊ StoreTileToGlobalMemory(R,I);
8  | | else
9  | | | foreach p∈v.Predecessor do
10 | | | ⌊ ComputeInMemoryIfUnavailable(G,p);
11 | | ⌊ ComsumeFromGlobalMem(G,v);
12 ⌊ ⌊ v.IsComputed = true;

---

To generate the code for computing the result of the pipeline the compiler invokes the function ComputeInMemoryIfUnavailable on the node in the producer-consumer DAG that computes the result image. If this stage is a stencil, the compiler starts with a default tile size (the size of the thread block on the GPU), and invokes the tiling code generation function ComputeTile. This function is described in Algorithm 1. For each predecessor in the producer-consumer DAG the size of the intermediate tile used to store the output of the predecessor node is computed at Line 4.

This size is the current tile size increased by the maximum positive and negative offsets used to access the result produced by the predecessor node within the stencil body of the current node. If the predecessor is a stencil operation itself, a recursive call is made to generate the code that computes the intermediate tile in shared memory. If not, the entire image corresponding to the output of the predecessor is evaluated in global memory by calling the function ComputeInMemoryIfUnavailable described in Algorithm 2, followed by the required tile loaded into shared memory. Since all the values needed to compute a tile of the output is now in shared memory, the compiler generates code to use these values and generate the output tile in shared memory as well.

On returning from the call to ComputeTile at Line 7, the compiler generates code to compute the index of the tile evaluated (ComputeTileIndex) and to store the computed tile to global memory (StoreTileToGlobalMemory). Note that for this final step, instead of computing the result tile in shared memory and later writing it to global memory, in some embodiments efficiency is improved by writing the values directly to global memory. Finally, if the function ComputeInMemoryIfUnavailable is invoked on a stage that is not a stencil, the compiler's code generator falls back to the default mode of first computing the result of all the predecessor nodes in global memory and consuming them to produce the result of this stage.

Figure 5:
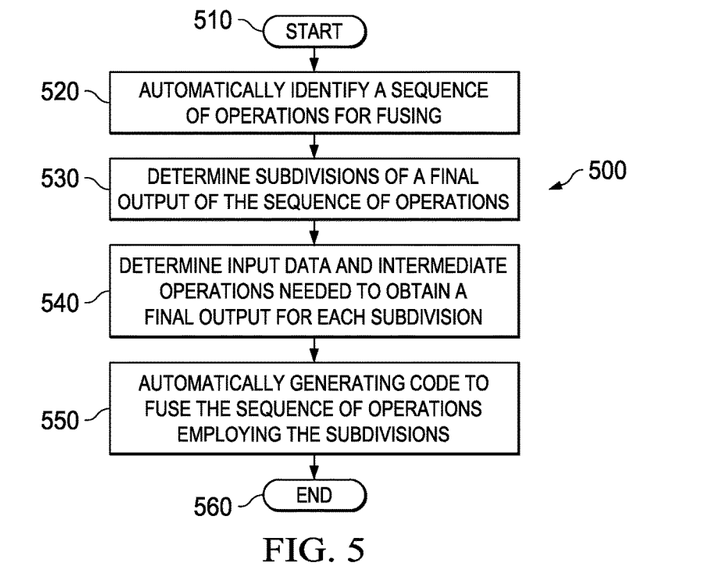
FIG. 5 illustrates a flow diagram of an embodiment of a method for reducing memory bandwidth for a sequence of operations carried out according to the principles of the disclosure.

Manually implementing tiling algorithms like the one described above while handling boundary conditions appropriately requires considerable effort on the part of application developers. In contrast, a compiler employing the methods and schemes disclosed herein can automatically handle boundaries while generating tiled code. FIG. 5 illustrates a compilation method that can be employed by a compiler to generate code that reduces memory bandwidth requirements.

FIG. 5 illustrates a flow diagram of an embodiment of a method 500 for reducing memory bandwidth for a sequence of operations carried out according to the principles of the disclosure. The method 500 can be carried out by a compiler, such as a DSL compiler. For example, the compiler can be a Forma compiler that generates CUDA code for parallel processors. The sequence of operations can be convolution kernels. In one embodiment, the convolution kernels are for image processing. The method 500 begins in a step 510.

In a step 520, a sequence of operations are automatically identified for fusing. The sequence of operations can be computations or functions for performing instructions from source code received by a compiler. In one embodiment, the sequence of operations are for a DSL. In some embodiments, the sequence of operations is generated by a compiler for use on, for example, an image processing pipeline.

In a step 530, subdivisions of a final output of the sequence of operations are determined. In one embodiment, the final output is an image and the subdivisions are tiles.

The method 500 continues to a step 540 where input data and intermediate operations needed to obtain a final output for each of the subdivisions is determined. Considering the image processing domain, the input data can be an input region of an input image. For example, the input data can be input region 330 of FIG. 3. In one embodiment, the intermediate operations are the computations or operations needed to obtain intermediate data to obtain the final output data. For example, the intermediate data can be intermediate tile 320 and the intermediate operation can be blurx.

In a step 550, code is automatically generated to fuse the sequence of computer-implemented operations. In one embodiment, the generated code is configured to save the input data in a local memory, perform the intermediate operations, save temporary results of the intermediate operations in the local memory, and save the final tile output in the external memory. The method 500 ends in a step 560.

Figure 6:
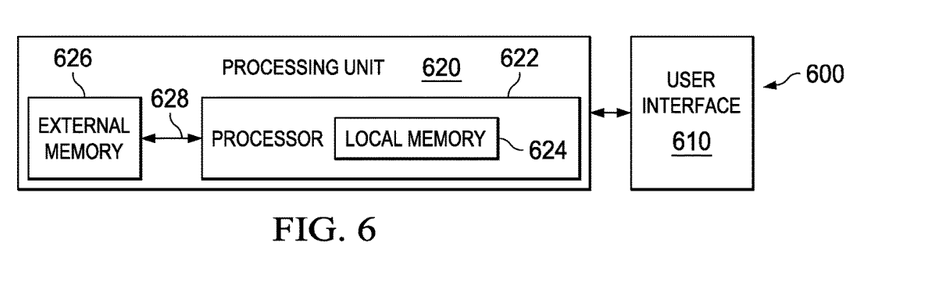
FIG. 6 illustrates a block diagram of an embodiment of a computer system configured to employ code generated according to the principles of the disclosure.

FIG. 6 illustrates a block diagram of an embodiment of a computer system 600 configured to employ code generated according to the principles of the disclosure. As such, the computer system 600 can employ executable code generated according to the method 500 and/or by the compiler 700 discussed below in FIG. 7. The computer system 600 includes a user interface 610 and a processing unit 620. In some embodiments, the computer system 600 is a mobile computing device such as a smart phone or a gaming device.

The user interface 610 is configured to provide interaction or communication between a user and the computer system 600. The user interface 610 is a display that includes a screen for user interaction. In one embodiment, the user interface 610 provides images generated by the processing unit 620 according to the principles disclosed herein. Other type of user interfaces, such as a mouse, a keyboard, gaming devices, etc., can be employed in addition to or instead of a display. In some embodiments, the user interface 610 is a touchscreen.

The processing unit 620 is configured to carry out the instructions of an application to provide an output. For example, the processing unit 620 can run a game application and provide images to the user interface 610 according to the instructions of the application. In one embodiment, the processing unit 620 is a graphics processing unit (GPU). In another embodiment, the processing unit 620 is a central processing unit (CPU). The processing unit 620 includes a processor 622, an external memory 626 and a data bus 628.

The processor 622 is configured to perform various operations on input data to obtain a final output, such as a final output image for the user interface 610. In some embodiments, the processor 622 is a graphics processor that is configured for parallel processing. For example, the processor 622 can be multiple parallel processors. In one embodiment, the processor 622 includes multiple streaming multi-processors coupled in parallel. For example, the processor 622 can be a Tesla K20c. In other embodiments, the processor 622 is a serial processor.

The processor 622 includes a local memory 624 or buffer that is configured to store data for the processor 622. The local memory 624 is proximate the processor and can be accessed without employing the data bus 628. In some embodiments, the local memory 624 is a shared local memory such as with a GPU. In other embodiments, the local memory 624 can be a cache such as associated with a CPU.

The external memory 626 is coupled to the processor 622 via the data bus 628. The external memory 626 stores the data to be processed by the processor 622. For example, for a GPU, the external memory is global memory. For a CPU, the external memory can be a main memory.

The data bus 628 is configured to communicate data between the processor 622 and the external memory 628. The data bus can be a conventional conductor used to communicate data in a processing unit. A memory bandwidth bottleneck can occur on the data bus 628 due to the read and writes of data on the external memory 626 required by the processor 622.

Figure 7:
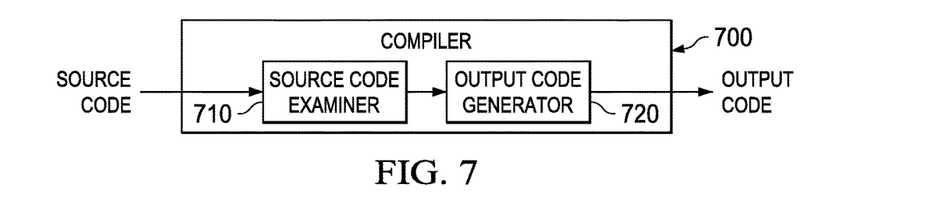
FIG. 7 illustrates a block diagram of an embodiment of a compiler constructed according to the principles of the disclosure.

FIG. 7 illustrates a block diagram of an embodiment of a compiler 700 constructed according to the principles of the disclosure. The compiler 700 is configured to generate output code based on a received source code. The output code can be machine code for a computer. The resulting output code can be employed on a computer system, such as computer system 600, to run an application according to the source code. In one embodiment, the output code is CUDA code. The compiler 700 is implemented on a computer system including a processor and a memory. For example, the compiler 700 can be implemented on a computer system such as the computer system 600. In some embodiments, the compiler 700 includes a series of operating instructions that are stored on the memory and direct the operation of the processor to provide the functions of the compiler 700 disclosed herein. In some embodiments, the series of operating instructions include Algorithm 1 and Algorithm 2. The compiler 700 includes a source code analyzer 710 and an output code generator 720.

The source code examiner 710 is configured to analyze the received source code and automatically identify a sequence of operations corresponding to the source code for fusing. In one embodiment, the source code examiner 710 is configured to automatically identify a sequence for fusing by locating a group of operations that have a producer-consumer relationship. In one embodiment, the source code examiner 710 is configured to employ a DAG to identify a sequence of operations for fusing. In some embodiments, the sequence is a convolution of operations or kernels.

The output code generator 720 is configured to automatically generate output code to fuse the sequence of operations employing subdivisions of a final output of the sequence of operations. As such, the output code generator 720 is configured to generate output code for execution of the fused sequence of operations employing subdividing. In the image processing domain, the output code generator 720 is configured to generated code for the tiled execution of the fused sequence. In one embodiment, the output code generator 720 determines subdivisions or tiles of the final output of the sequence of operations and then determines input data and intermediate operations needed to obtain a final subdivision output for each of the subdivisions. The output code generator 720 then automatically generates output code to save the input data in a local memory, perform the intermediate operations, save temporary results of the intermediate operations in the local memory. In some embodiments, the output code generator 720 also generates output code to save the final subdivision output in the local memory.

The above-described methods or at least part thereof may be embodied in or performed by various conventional devices, such as digital data processors, microprocessors or computing devices, wherein these devices are programmed or store executable programs of sequences of software instructions to direct a processor to perform one or more of the steps of the methods or schemes disclosed herein, e.g., steps of the method of FIG. 5. The software instructions of such programs may be encoded in machine-executable form on conventional digital data storage media, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 5. An apparatus, such as a compiler, may be designed to include the necessary circuitry to perform at least some of the steps of the methods of FIG. 5 and the memory bandwidth reduction schemes disclosed herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A method for compiling code to reduce memory bandwidth when processing code on a computer, comprising:
    automatically identifying a sequence of operations for fusing, wherein said sequence of operations correspond to instructions from a source code;
    determining subdivisions of a final output of said sequence of operations;
    analyzing at least one of said subdivisions final output;
    determining input data and intermediate operations, using said analyzing of said at least one of said subdivisions final output, needed to obtain a final subdivision output for each of said subdivisions;
    automatically generating code to fuse said sequence of operations employing said subdivisions, wherein:
        said automatically identifying and said automatically generating are performed by a processor; and
        said automatically generating includes generating code to:
            save said input data in a local memory;
            perform said intermediate operations; and
            save temporary results of said intermediate operations in said local memory; and
    generating code to save said final subdivision output for each of said subdivisions in an external memory, wherein said saving said input data in said local memory, said saving said temporary results of said intermediate operations in said local memory, and saving said final subdivision output for each of said subdivisions in said external memory reduces said memory bandwidth independent of a skill of a programmer.

2. The method as recited in claim 1 wherein said sequence of operations is functions or computations to perform said instructions from said source code.

3. The method as recited in claim 1 wherein said automatically generating code is for a targeted computer architecture.

4. The method as recited in claim 1 wherein said sequence of operations is for a domain specific language.

5. The method as recited in claim 1 wherein said sequence of operations includes computations or functions for image processing.

6. The method as recited in claim 1 wherein said automatically identifying said sequence of operations for fusing is based on a producer-consumer relationship of said operations.

7. The method as recited in claim 1 wherein said automatically identifying said sequence of operations for fusing is based on a directed acyclic graph of said sequence of operations.

8. The method as recited in claim 1 wherein said sequence of operations is a sequence of convolution kernels for a graphics processing pipeline.

9. A computer program product including a series of operating instructions stored on a non-transitory computer readable medium that directs a processor to perform a method to generate executable code for operation on a computer system, wherein the method comprises:
    automatically identifying a sequence of operations for fusing, wherein said sequence of operations correspond to instructions from a source code;
    determining subdivisions of a final output of said sequence of operations;
    analyzing a final subdivision output of each of said subdivisions;
    determining, using said analyzing, input data and intermediate operations needed to obtain said final subdivision output for each of said subdivisions;
    automatically generating executable code for operation on a particular computer architecture, wherein said executable code fuses said sequence of operations employing said subdivisions, wherein said automatically generating includes generating code to:
        save said input data in a local memory;
        perform said intermediate operations; and
        save temporary results of said intermediate operations in said local memory; and
    generating code to save said final subdivision output for each of said subdivisions in an external memory, wherein said saving said input data in said local memory, saving said temporary results of said intermediate operations in said local memory, and saving said final subdivision output for each of said subdivisions in said external memory reduces memory bandwidth independent of a skill of a programmer.

10. The computer program product as recited in claim 9 wherein said sequence of operations is functions or computations of a domain specific language that direct a processor of said computer architecture to implement said instructions from said source code.

11. The computer program product as recited in claim 9 wherein said automatically identifying said sequence of operations for fusing is based on a producer-consumer relationship of said operations.

12. The computer program product as recited in claim 9 wherein said automatically identifying said sequence of operations for fusing is based on a directed acyclic graph of said sequence of operations.

13. The computer program product as recited in claim 9 wherein said sequence of operations is a sequence of convolution kernels for a graphics processing pipeline.

14. The computer program product as recited in claim 9 wherein said sequence of operations includes computations or functions for image processing.

* * * * *

UNITED STATES PATENT AND TRADEMARK OFFICE
CERTIFICATE OF CORRECTION

PATENT NO. : 10,152,310 B2
APPLICATION NO. : 14/723141
DATED : December 11, 2018
INVENTOR(S) : Mahesh Ravishankar, Paulius Micikevicius and Vinod Grover Page 1 of 1

It is certified that error appears in the above-identified patent and that said Letters Patent is hereby corrected as shown below:

In the Specification

Column 4, Line 56, after --Listing-- insert --1--

Signed and Sealed this
Fifth Day of March, 2019

Andrei Iancu
*Director of the United States Patent and Trademark Office*